United States Patent [19]

Miyake et al.

[11] Patent Number: 4,916,550
[45] Date of Patent: Apr. 10, 1990

[54] FOLDABLE PORTABLE OPTICAL INSTRUMENT

[75] Inventors: Michihiro Miyake; Youichi Sawaji; Kazuhisa Horikiri; Kazuhiro Tokuda; Makoto Nakazawa, all of Tokyo, Japan

[73] Assignee: Fuji Photo Film Co., Ltd., Kanagawa, Japan

[21] Appl. No.: 305,581

[22] Filed: Feb. 3, 1989

[30] Foreign Application Priority Data

| Feb. 5, 1988 | [JP] | Japan | 63-14219 |
| Feb. 8, 1988 | [JP] | Japan | 63-15575 |
| Apr. 15, 1988 | [JP] | Japan | 63-50510 |
| Apr. 15, 1988 | [JP] | Japan | 63-50511 |
| Apr. 15, 1988 | [JP] | Japan | 63-93216 |

[51] Int. Cl.$^4$ .............................. H04N 1/00
[52] U.S. Cl. .................. 358/471; 358/255; 358/475; 358/229
[58] Field of Search ............ 358/471, 475, 479, 255, 358/229

[56] References Cited

U.S. PATENT DOCUMENTS

| 4,569,572 | 2/1986 | Kopich | 358/255 |
| 4,631,599 | 12/1986 | Cawkell | 358/479 |
| 4,633,324 | 12/1986 | Giulie | 358/255 |
| 4,831,455 | 5/1989 | Ishikawa | 358/471 |

Primary Examiner—Howard W. Britton
Attorney, Agent, or Firm—Sughrue, Mion, Zinn, Macpeak & Seas

[57] ABSTRACT

A foldable, portable optical instrument has an optical imaging head for providing an image of, or video signals of, a material placed on a table of a main housing structure of the optical instrument. The foldable instrument includes a head support mounted for raising-up and folding-down movement to rotatably support the imaging head and to position the imaging head over the table, units for illuminating the material on the table, respective supporting structures mounted for raising-up and folding-down movement to support the illumination units upwardly with respect to the table when the head support is raised up, and a cover attached to the head support for covering the illumination units and the supporting structures when the head support is folded down. The foldable instrument is provided with a carrying handle which can be drawn out of the outline of the instrument when the unit is folded down to enable grasping to carry around the instrument. The instrument preferably is used with a shading member, detachably mounted on the imaging head, to prevent the material on the table from receiving light other than from the imaging head.

15 Claims, 9 Drawing Sheets

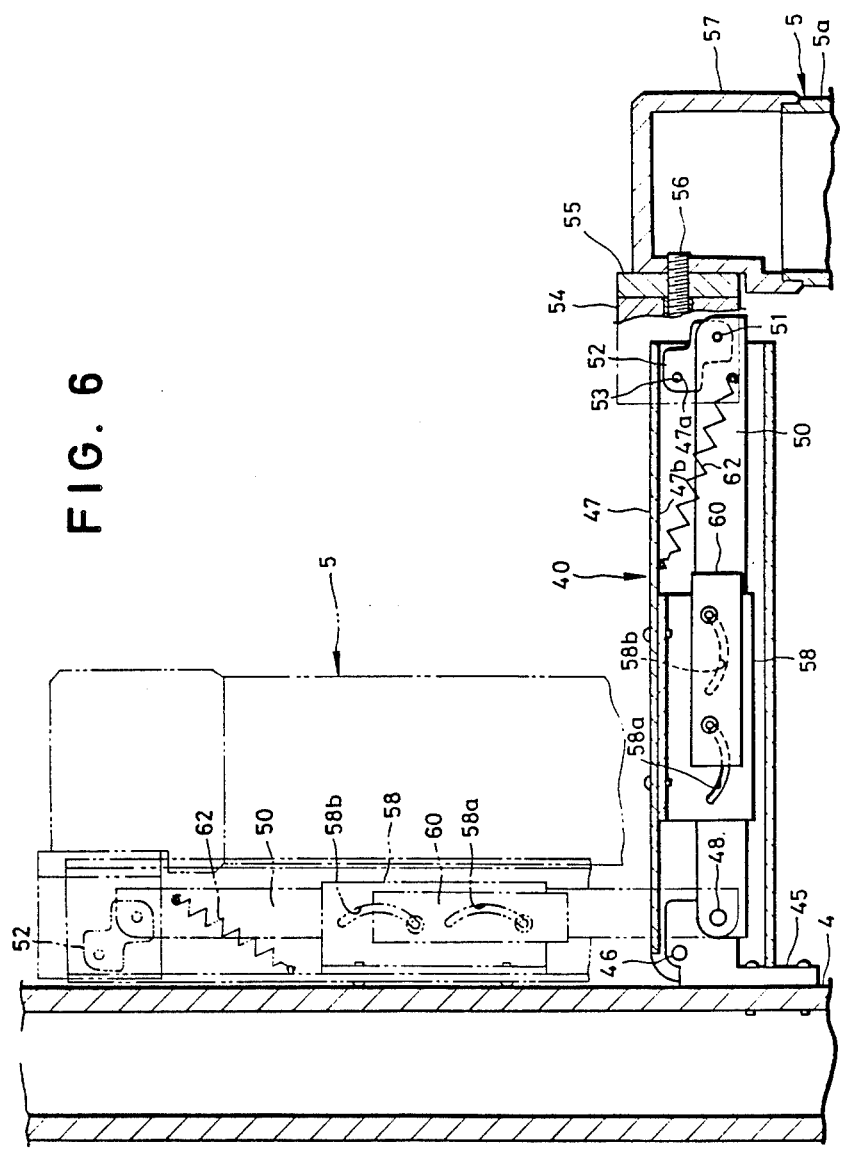

FOLDABLE PORTABLE OPTICAL INSTRUMENT

BACKGROUND OF THE INVENTION

The present invention relates to a foldable, portable optical instrument, and more particularly to an optical apparatus for providing video signals corresponding to an original image, the video signals being input to a video monitor or a video deck to display the image.

There are various types of foldable and portable optical instruments, such as an image input apparatus for transmitting video signals of an original image provided by a video camera to a CRT monitor or a video deck or overhead projectors for projecting an image onto a remote screen. Some such image input apparatuses are portable and are covered to protect their optical systems and video cameras when not in use.

An image input apparatus of the just-mentioned type is provided with a cover pivotably mounted on a box-like body casing, enabling pivotal movement for opening and closing the body case. The casing of the image input apparatus has a table for placing an original thereon. The cover incorporates a lighting system for illuminating the original placed on the table and a reflective mirror for reflecting and directing an image of the original to a video camera disposed in the body casing.

Such foldable, portable optical instruments have poles, fixedly mounted on body casings for holding lighting systems to illuminate an original and a video camera to take an image of the illuminated original. To provide a sharp and clear image, various types of lighting systems are prepared to cooperate with such instruments or are incorporated therein to provide even illumination over the document.

In order to avoid flaring or ghosting of the image, the optical instruments usually are provided with shading members to prevent an original placed on the table from receiving ambient light or light from room lamps. With the recent improvement of image sensor elements, the image input apparatus has become lighter and more compact. To facilitate portability, such lighting systems and/or shading members are adapted to be disassembled and stored in a carrying case of the optical instrument.

Also, the foldable, portable optical instruments are provided with carrying handles which can be brought down when they are not in use, for ease of carrying.

Generally, it is difficult to make the above noted optical instruments more compact, and especially thinner, and to illuminate an original uniformly. Further, these instruments are structually and mechanically weak because the carrying handles are mounted on brackets which, though required to support a heavy instrument, usually are small and weak because of the need for compactness of the instruments. Therefore, the carrying handle and its associated parts are broken easily.

In addition to the above noted drawback, the optical instruments with foldable lighting systems are somewhat difficult to fold and unfold. Further, the shading member for use with the foldable, compact optical instruments is relatively small in size and, therefore, is not effective to shut off undesired illumination, so that flaring or ghosting often is created.

SUMMARY OF THE INVENTION

In view of the foregoing, it is one object of the present invention to provide an optical instrument which can be folded to provide a thin profile and to be compact.

It is another object of the present invention to provide an optical instrument with a lighting system which can illuminate an original evenly.

It is yet another object of the present invention to provide an optical instrument with a lighting system which can be easily folded and unfolded.

It is a further object of the present invention to provide an optical instrument with a carrying handle which is superior in mechanical strength and which is easily handled.

It is a yet further object of the present invention to provide a shading member for use with a foldable, compact optical instrument.

The above and other objects of the present invention are accomplished by a foldable optical instrument having a base structure with a table, and a foldable optical imaging head for providing video signals of an image of an original material placed on the table of the base structure. The foldable optical instrument includes head supporting means, mounted for raising-up and folding-down movement on the base structure, for rotatably supporting the optical imaging head and positioning the imaging head above the table: a pair of illumination units for illuminating the original material placed on the table; a pair of illumination unit supporting structures mounted for raising-up and folding-down movement on the head supporting means, for supporting the pair of illumination units, each illumination unit supporting structure positioning each illumination unit upwardly with respect to the table when the supporting means is raised; and a cover, attached to the head supporting means, for covering the pair of illumination units and the pair of illumination unit supporting structure when the head supporting means is folded down.

According to one preferred embodiment of the present invention, the illumination unit supporting structure comprises an arm rotatably mounted at one end of the head supporting means, a supporting member rotatably mounted on the other end of the arm for rotatably supporting the illumination unit, and a link mechanism, connected between the head supporting member and the arm, for turning the supporting member in cooperation with the rotational movement of the arm to position the illumination unit at a right angle relative to the arm, thereby bringing the illumination unit into a laterally upward position with respect to the table.

According to another preferred embodiment of the present invention, the foldable optical instrument is provided with a carrying handle for carrying around the apparatus, the handle being notably and slidably mounted on a shaft attached to the main housing of the apparatus so as to be drawn out of the outline of the apparatus when the unit is folded down, the handle thus being graspable for carrying around the apparatus. Preferably, the carrying handle includes means for pushing the carrying handle slightly out of the outline of the apparatus in cooperation with the folding-down movement of the unit to make the carrying handle ready to be grasped, and for putting the carrying handle within the outline of the apparatus in cooperation with the raising-up movement of the unit.

According to still another preferred embodiment of the present invention, there is provided a shading member for use with the foldable optical instrument, the shading member including a center section detachably mounted on the image input device, and two foldable side sections formed integrally with the center sections, one on each side of the center section, each section being supported by a respective illumination unit. The shading member can be folded into three sections and placed inside the apparatus for storage. The shading member can assist in formation of a clear image, in particular in combination with the illumination unit thus supported with the above illumination unit supporting structure.

When raised, the illumination unit supporting structure can position the illumination unit laterally upwardly with respect to the table to illuminate the original material on the table uniformly, thus helping to provide a clear image. Further, the illumination unit supporting structure and the illumination unit can be easily folded down to a compact form for easy carrying.

With the carrying handle structured as above, the apparatus has a streamlined folded configuration. In addition the carrying handle structure, which pushes out the carrying handle in cooperation with the folding-down movement of the image input head assembly provides easy grasping of the carrying handle.

BRIEF DESCRIPTION OF THE DRAWINGS

The invention now will be described in detail with reference to the accompanying drawings, in which:

FIG. 6 is a longitudinal sectional view showing an arm structure according to another embodiment of the present invention:

FIG. 9 is a partial longitudinal sectional view showing the carrying handle structure of FIG. 8 in which the carrying handle is pulled in;

FIG. 11 is a partial longitudinal sectional view similar to FIG. 9 in which the carrying handle is pulled in;

DETAILED DESCRIPTION OF THE PREFERRED EMBODIMENTS

Figure 1:
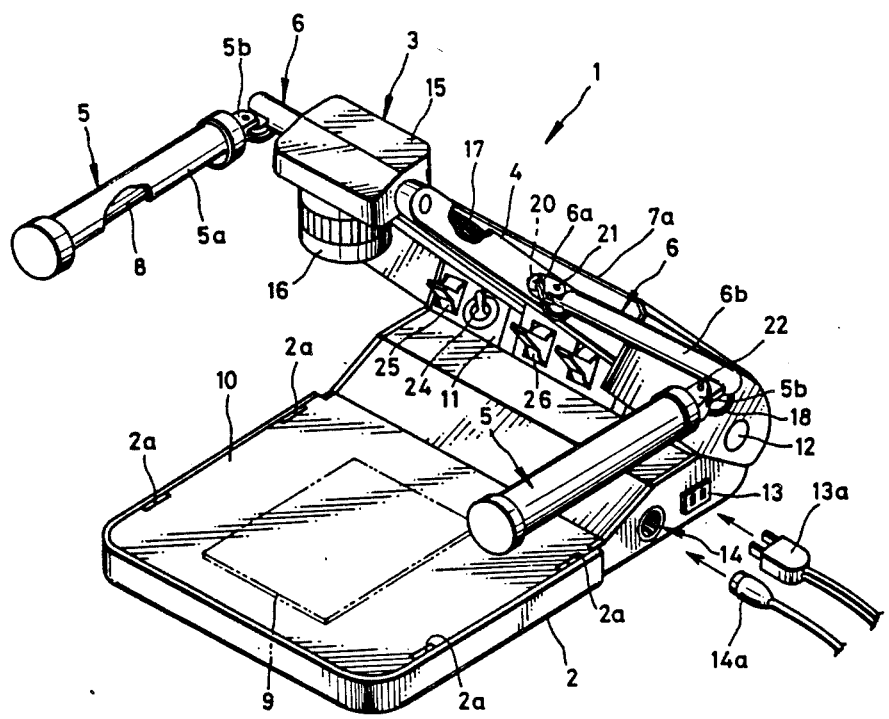
FIG. 1 is a perspective view showing the image input apparatus in use according to the present invention.
Figure 2:
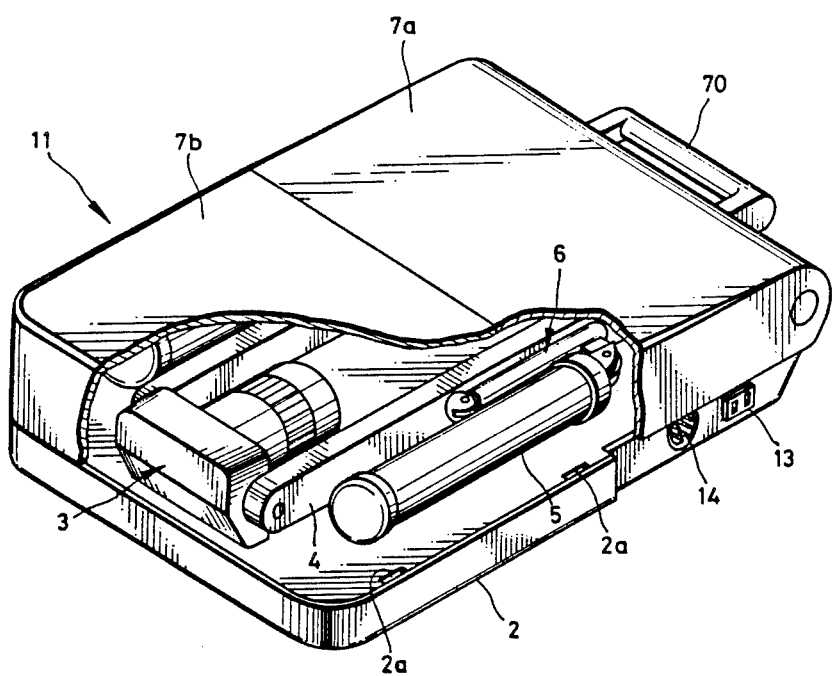
FIG. 2 is a perspective view, partly cut away, showing the configuration of the image input apparatus when not in use.

Referring to FIGS. 1 and 2, there is shown an image input apparatus 1 according to a preferred embodiment of the present invention. The apparatus 1 includes a generally box-shaped casing 2, a pair of hollow poles 4 pivotally mounted on a shaft 12 attached to the casing 2, an image input head 3 pivotably supported between the upper ends of the hollow poles 4, and a pair of illumination lamp units 5 attached to the hollow poles 4 through connecting arms 6.

The casing is provided with a top table 10 on which an original 9 is placed, and an operation panel 11 at the rear end having various switches, such as a power switch 24, a video switch 25 for transmitting video signals from the image input head 3, a lamp switch 26 etc. In one side wall of the casing 2, there are an electric plug receptacle or socket 13 and a connector socket 14 for connecting the image input head 3 to a video signal receiver. Under the operation panel 11 in the casing, there is circuitry for controlling action of the image input head 3 and the like.

A generally box-shaped, fixed lower cover 7a is secured to the back of the hollow poles 4 to open and close the casing 2 when the hollow poles 4 are turned up and down about the shaft 12. The shaft 12 incorporates therein a lock mechanism (not shown) for locking the hollow poles 4 at a desired angle. At the bottom end of the fixed cover 7a is a carrying handle 70, as shown in FIG. 2.

The image input head 3 has an image pick-up unit 15 including a solid image pick-up device, such as a charge coupled device. A zoom lens 16, disposed in front of the image pick-up unit 15, transmits video signals of an image of the original 9 placed on the table 10 to an external CRT monitor or a floppy recorder connected thereto through one of wires 17, disposed in one of the hollow poles 4, and the connector socket 14.

Each arm 6 comprises a connecting section 6a rotatably supported by a shaft 20 mounted on a bracket attached to the hollow pole 4, and an arm section 6b pivotably supported by a shaft 21 mounted on the connecting section 6a. Each illumination lamp unit 5 includes a tube-like reflector 5a with a wide slot and an illumination lamp 8 disposed in the tube-like reflector 5a. The illumination lamp unit 5 is connected to the arm section 6b through a bracket 5b formed at one end thereof and pivotally mounted on a shaft 22 attached to the arm section 6b.

To position the illumination lamp unit 5 at any desired angle, it is desirable to provide a friction mechanism between the illumination lamp unit 5 and the arm section 6b of the arm 6. Each illumination lamp 8 is connected to the lamp switch 26 through one of the wires 17 which extends inside the hollow arm 6 and hollow pole 4 with part of that wire being exposed outside around the connection between the arm 6 and the hollow pole 4, as shown in FIG. 1.

In FIG. 2 showing the image input apparatus 1 when not in use, the image input head 3 is moved down to place the zoom lens 16 between the hollow poles 4. The respective arms 6 and the illumination lamp units 5 are folded and placed in the casing 2 between the hollow poles 4 and side walls of the fixed cover 7a, respectively. A removable, upper cover section 7b is removably fixed to the casing to enclose the folded down image input head 3.

When using the image input apparatus constructed as above the removable cover 7b is removed from the casing 2 of the image input apparatus 1, and the hollow poles 4 with the fixed cover 7a are raised and locked at a desired angle. Thereafter the image input head 3 is turned to position the zoom lens 16 to face the table 10. The bracket 5b of the illumination lamp unit 5 is held with one's fingers and is pulled to turn the connecting section 6a of the arm 6 about the shaft 20, positioning substantially horizontally the arm 6 and the illumination lamp unit 5 which are folded. Thereafter, the illumination lamp unit 5 is horizontally turned about the shaft 22 and placed at a right angle relative to the arm 6, and the arm section 6b of the arm 6 is turned about the shaft 21 through approximately a right angle. Finally the connecting section 6a of the arm 6 is turned about the shaft 20 through approximately 180 degrees, positioning the unfolded arm 6 and lamp unit 5 horizontally as shown in FIG. 1.

After connecting an electric plug 13a of the power source and the connecting plug 14a of the CRT monitor to the plug sockets 13 and 14, respectively the power switch 24 is turned on to activate the image input head 3. Before or after the activation of the image input head 3, the original 9 is placed on the table 10 and the lamp switch 26 is turned on to energize the lamps 8. Thereafter, if the video switch 25 is turned on, the image input head 3 provides the CRT monitor with video signals to display an image of the original on the screen of the CRT monitor. When viewing the image on the CRT monitor screen, the zoom lens 16 is operated in a well known manner to focus on the original 9, to magnify the image, and to adjust the brightness of the image so as to display the image sharply on the CRT monitor screen.

Figure 3:
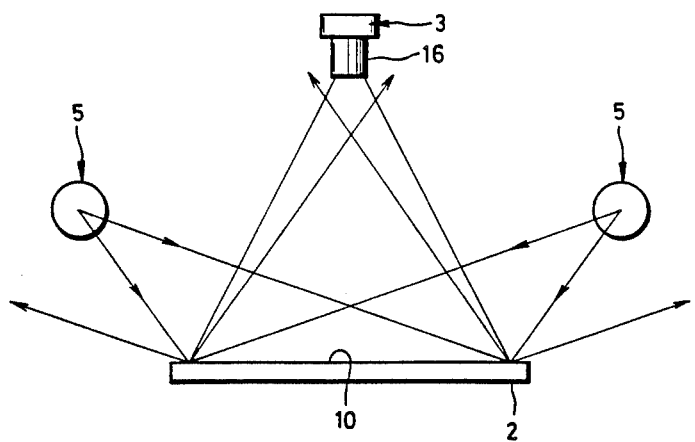
FIG. 3 is a schematic illustration showing the optical relationship between the image input head and illumination units.

The image input apparatus 1, arranged as described, has the image input head 3, illumination lamp units 5, and the table 10 positioned in a particular relative configuration, as shown in FIG. 3. In accordance with this relative disposition, because the illumination lamp units 5 are sufficiently far away from the table 10 and are positioned at an appropriate angle relative to the surface of the table 10, the lamps 8 can illuminate the surface of the original 9 on the table 10 evenly. Also, the image input head 3, and in particular the zoom lens 16 can be prevented from receiving light directly from the lamps 8 and light reflected from the table 10, thus enabling the zoom lens 16 to provide an even, sharp image of the original 9. Additionally, the fixed cover 7a secured to the hollow poles 4 prevents partly undesirable ambient light passing through between the hollow poles 4. This advantageously provides a yet clearer image.

To fold the image input apparatus 1, the arms 6 are folded in the reverse order of the set-up procedures described above and thus are laid down along the hollow poles 4, respectively. Then, the image input head 3 is turned down and placed between the hollow poles 4. The lock mechanism incorporated in the shaft 12 is released to unlock and fold down the hollow poles 4. The fixed cover 7a accordingly covers the operation panel 11 as shown in FIG. 2. After this, the removable cover 7b is placed over the table 10 of the casing 2 to engage lugs (not shown) thereof with grooves 2a formed in the edge of the casing 2. In this way, the image input apparatus 1 is shaped like a compact portable attache case for easy carrying or for storage. It is not essential to provide the removable cover 7b separately from the fixed cover 7a.

Figure 4:
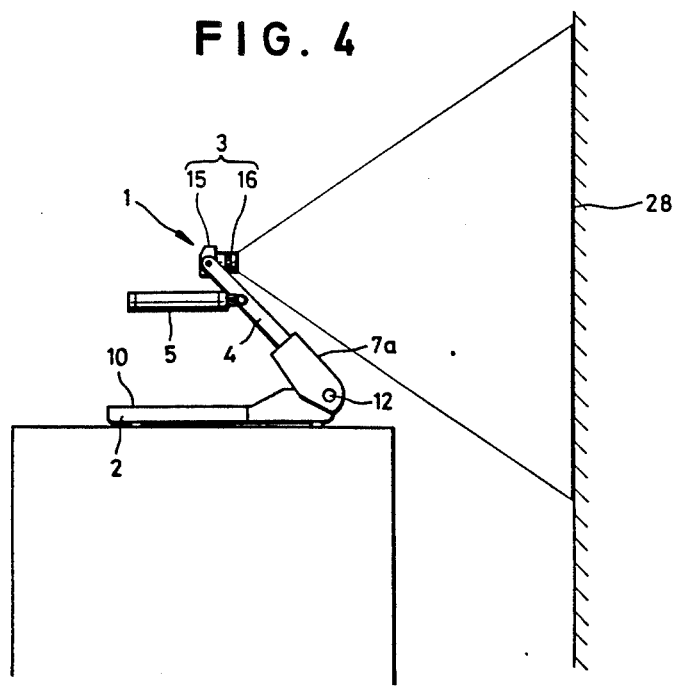
FIG. 4 is a schematic illustration of the image input apparatus in use.

FIG. 4 shows the image input apparatus 1 as used to provide an image of a large original placed on a wall. The image input head 3 can be turned and locked to face the zoom lens 16 toward a vertical wall 28. According to such an application, an image of an original which is too large to be placed on the table 10 of the casing of the image input apparatus 1 can be shown. In this application the arms 6 are turned to face the lamp units 5 toward the wall.

Figure 5:
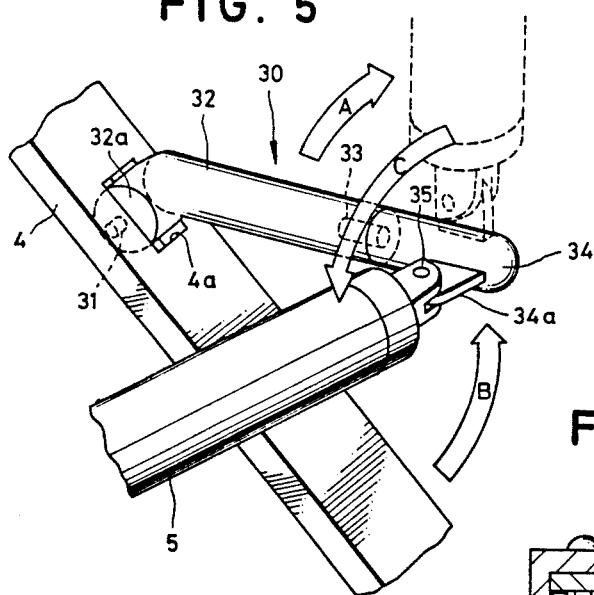
FIG. 5 is a perspective illustration of an arm structure according to one embodiment of the present invention.

FIG. 5 shows an alternative arm 30 which is unfolded to support the illumination lamp unit 5. As shown, the arm 30 includes first and second arm sections 32 and 34 which are connected to each other by a shaft 33 for relative rotation. The second arm section 34 is provided with a bracket 34a at one end. The bracket 34a has a shaft 35 for pivotably supporting the bracket 5b of the illumination lamp unit 5. In one side wall of the hollow pole 4, there is formed an opening 4a for receiving one end 32a of the first arm section 32. Inside the opening 4a in the hollow pole 4, there is a shaft 31 which rotatably supports the first arm section 32 of the arm 30.

The arm 30 is folded along the hollow pole 4 like the arm 6 in the previously described embodiment. To unfold or raise up the arm 30, the illumination lamp unit 5 is turned about the shaft 35 and laterally raised as shown by an arrow A, and the arm 30 then is turned about the shaft 31 and raised as shown by an arrow B. After this, the second arm section 34 is turned about the shaft 33 through approximately 90 degrees in a direction shown by an arrow C to position the lamp unit 5 horizontally.

FIG. 6 shows another embodiment of an arm structure 40 for supporting the illumination lamp unit 5. The arm structure 40 includes a hollow arm 47 pivotally and rotatably mounted on a shaft 46 held with a L-shaped bracket 45 secured to the hollow pole 4. A link lever 50 having a U-shaped cross section is pivotally and rotatably mounted on a shaft 48 held with the L-shaped bracket 45 at one end and extending in the hollow arm 47. A crank lever 52 pivotally mounted on a shaft 51 is fixed to the opposite end of the link lever 50.

A supporting block 54 supported with a shaft 53 which passes the crank lever 52 through a hole 47a formed in the crank lever 52 is pivotally mounted on the side walls of the hollow arm 47. The supporting block 54 has a connecting member 57 pivotally mounted thereon with a shaft 56 through a spacer plate 55. At a right angle relative to the hollow arm 47, the bottom end of the illumination light unit 5 is secured to the connecting member 57. Between the supporting block 54 and the connecting member 57, there is a click mechanism (not shown) for positioning the illumination light unit 5 at an extended or a folded position.

Figure 7:
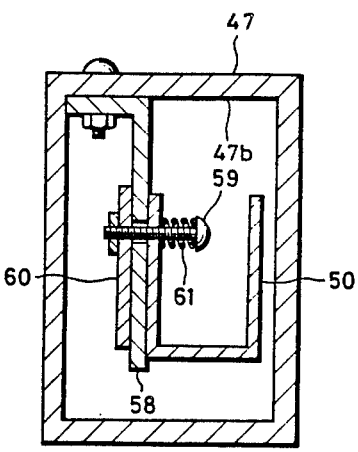
FIG. 7 is a cross sectional view of an arm of the arm structure shown in FIG. 6.

FIG. 7 shows a cross section of the arm structure 40 shown in FIG. 6. The hollow arm 47 has fixedly mounted on its inner wall 47b an L-shaped bracket 58 whose surface is in slidable contact with the outer surface of the U-shaped link lever 50. The L-shaped bracket 58 is formed with two arcuate slots 58a and 58b (shown in FIG. 6) for movably receiving threaded guide pins 59, such as screws, extending from the link lever 50 to define the movement of the link lever substantially in an axial direction. The guide pin 59 connects the link lever 50 to a back-up plate 60 to sandwich the L-shaped bracket 58 therebetween. A coil spring 61 is provided between the head of the guide pin 59 and the inner surface of the link lever 50. By tightening or loosening the guide pin 59, friction force exerted onto the link lever 50 is varied. As shown in FIG. 6, a spring 62 is suspended between the inner wall 47b and the link lever 50 in the hollow arm 47 to bias the hollow arm 47 to prevent it from undesirably turning from the folded position.

Although when the hollow arm 47 is extended, the spring 62 exerts a large biasing force on the hollow arm 47 and tends to return it, a click mechanism (not shown) is provided between the link lever 50 and the L-shaped bracket 58 to prevent the illumination lamp unit 5 from being forced to change in position by the spring 62. In the connecting member there is a socket (not shown) for connecting the fluorescent lamp 8.

In the operation of the arm structure 40, when pulling and turning the illumination light unit 5 through 90 degrees about the shaft 56 while gripping the free end thereof from a folded position shown by a double-dotted line in FIG. 6 after raising up the hollow poles 4, the illumination light unit 5 is placed parallel to the table 10 and stopped with a click action. Then, the hollow arm 47 is turned through about 90 degrees about the shaft 46 to raise up the arm structure 40. As a result, the link lever 50 is forced to turn about the shaft 48 against the spring 62 and the friction of the L-shaped bracket 58 followed by the 90 degree rotation of the crank lever 52 about the shaft 33, turning the supporting bracket 54 through 90 degrees. The arm structure 40 and the illumination lamp unit 5 can be folded in the reverse order.

Figure 8:
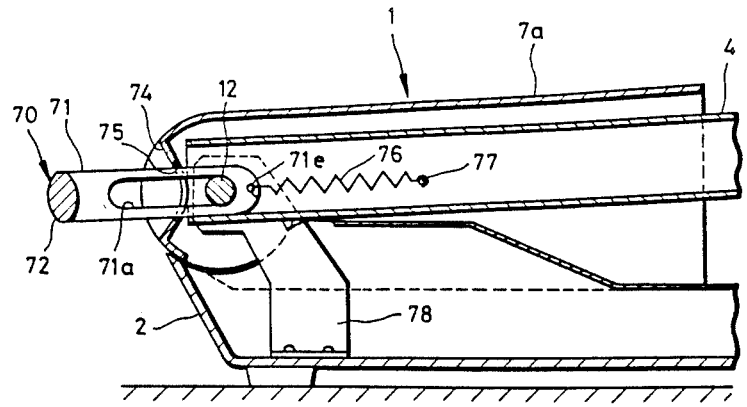
FIG. 8 is a partial longitudinal sectional view showing a carrying handle structure according to one embodiment of the present invention in which a carrying handle is drawn out.
Figure 9:
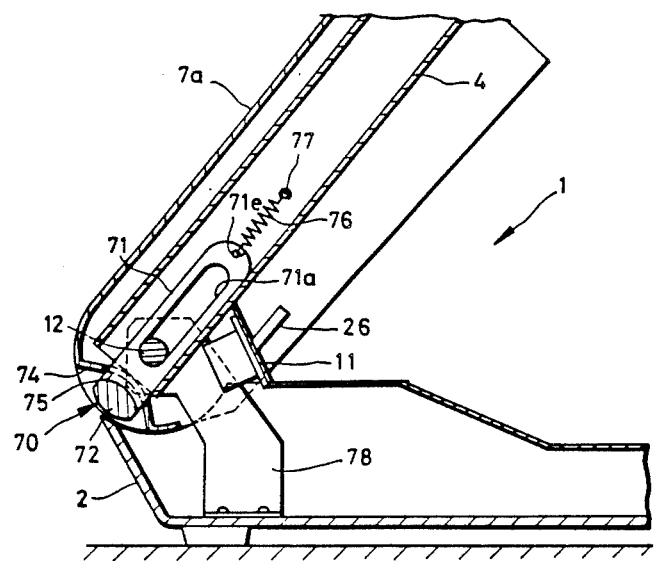

FIGS. 8 and 9 show in detail a structure of the carrying handle 70 shown in FIG. 1. On the bottom plate of the casing 2 a pair of brackets 78 are mounted to support the shaft 12. On the shaft 12 are mounted the hollow poles 4, the generally box-shaped lower cover 7a and a pair of brackets 71 formed integrally with the carrying handle 70. The lower cover is formed at its lower end with a semi-circular recess 74 for receiving a cross member 72 of the carrying handle 70 and a pair of slits 75 through which the brackets 71 slidably extend.

Each bracket 71 is formed with an elongated slot 71a for slidably receiving the shaft 12. The bracket 71 is further formed with a retainer hole 71e at its end to retain one end of a biasing spring 76 of which the other end is secured to a lug 77 extending inside from the hollow pole 4. The biasing spring 76 causes the bracket 71 of the carrying handle 70 to be pulled forcibly toward the inside of the hollow pole 4, placing the cross member 72 inside the outline of the lower cover 7a to avoid the prevention of raising up of the hollow poles 4.

To carry around the image input apparatus 1, the carrying handle 70 is pulled out against the biasing spring 76 and gripped. The carrying handle 70 in particular the brackets 71, can support the shaft 12 with the end of the elongated slots 71a of the brackets 71 while the image input apparatus 1 hangs down therefrom for carrying. If the carrying handle 71 is released, the carrying handle 71 is automatically pulled by the biasing spring 76 and is seated in the recess 74 of the lower cover 7a.

Because the shaft 12 has a supporting structure sufficiently strong to pivotally support the hollow poles 4, it has sufficient strength and durability to support the carrying handle 70.

Figure 12:
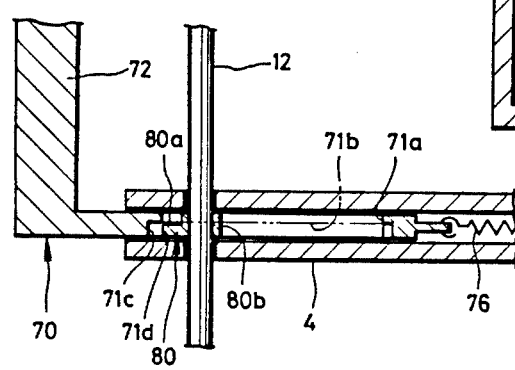
FIG. 12 is a longitudinal sectional view showing an essential part of the carrying handle structure of FIGS. 10 and 11.
Figure 10:
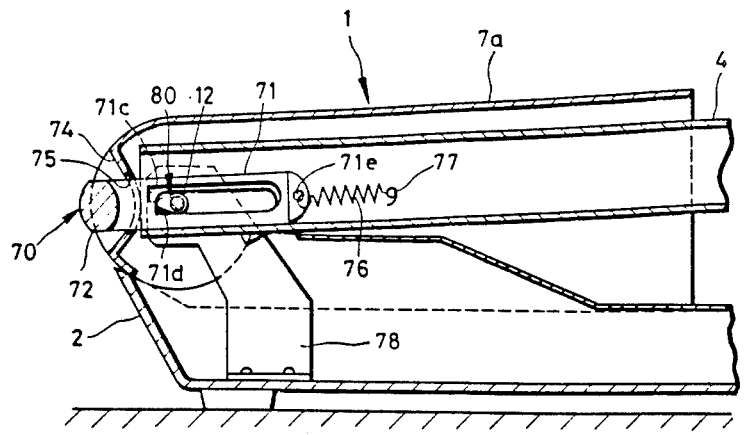
FIG. 10 is a partial longitudinal sectional view similar to FIG. 8 showing a carrying handle structure according to another embodiment of the present invention in which a carrying handle is drawn out.
Figure 11:
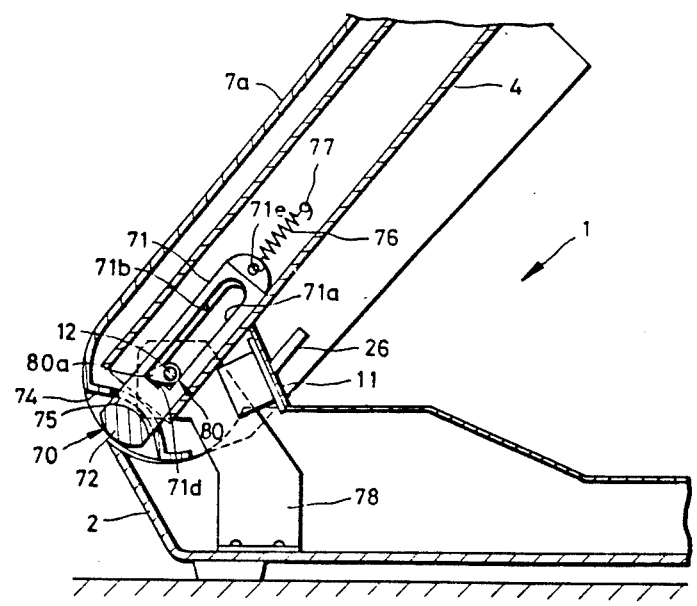

FIGS. 10 to 12 show an alternative embodiment of the structure of the carrying handle 70 shown in FIGS. 8 and 9. Because the major parts are identical, and accordingly are indicated by the same reference numbers as those of the structure of the carrying handle 70 of FIGS. 8 and 9, the following description will be directed to parts different from the carrying handle structure of FIGS. 8 and 9.

A cam 80, which is located in the elongated slot 71a of the bracket 71 of the carrying handle 70, is fixedly mounted on the shaft 12. The elongated slot 71a is formed at one end with a shoulder 71d defining a notch 71c for receiving the cam robe 80a of the cam 80, and a step 71b along the upper edge of the slot 71a for receiving the base portion 80b and the cam robe 80a of the cam 80, respectively.

While turning the hollow poles 4 about the shaft 12 and raising it up to unfold or set up the image input apparatus 1. the cam robe 80a of the cam 80 fixedly mounted on the shaft 12 is brought into engagement with the notch 71c under biasing force of the spring 76. On the other hand, when the hollow poles 4 are folded, the shoulder 71d of the slot 71a of the bracket 71 is pressed by the cam robe 80a of the cam 80 to move back the bracket 71 against the biasing spring 76, to push out the cross beam 72 of the carrying handle 70 partly outside the semi-circular recess 74 of the lower cover 7a. This makes it easy to grasp the cross beam 72. Accordingly, it is quite easy to pull out and grip the carrying handle 70 to carry around the image input apparatus 1.

Figure 13:
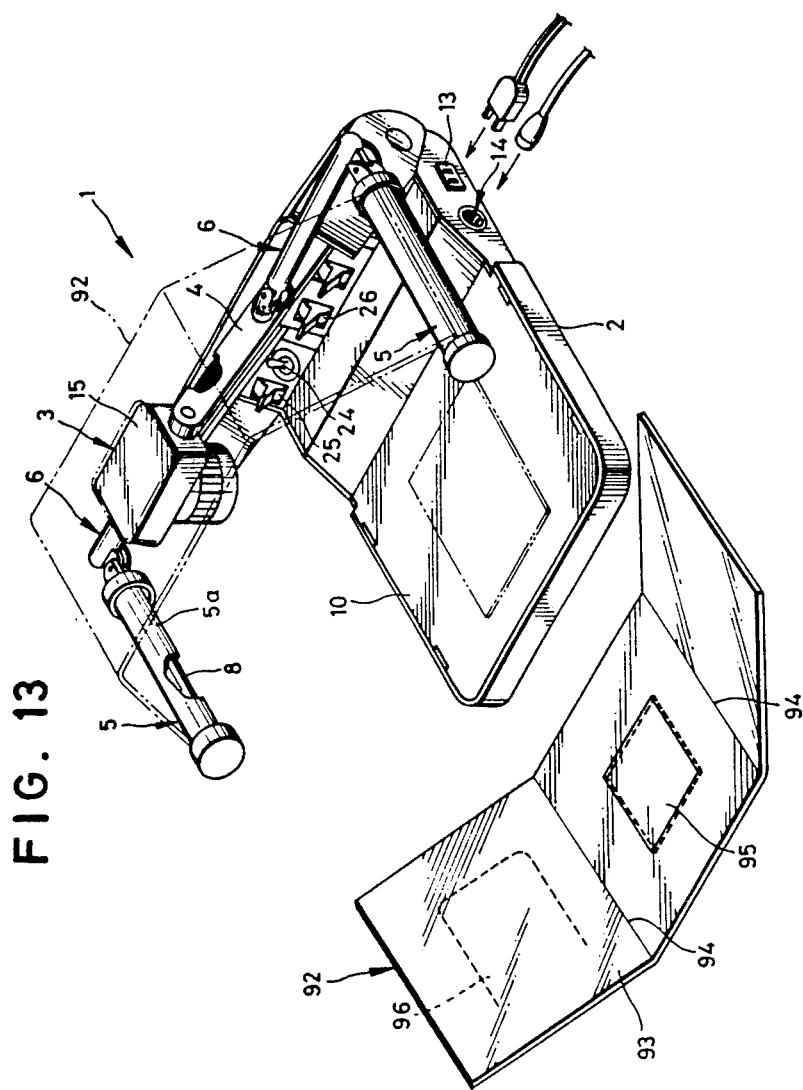
FIG. 13 is a perspective view showing an image input apparatus with a shading member detached.
Figure 14:
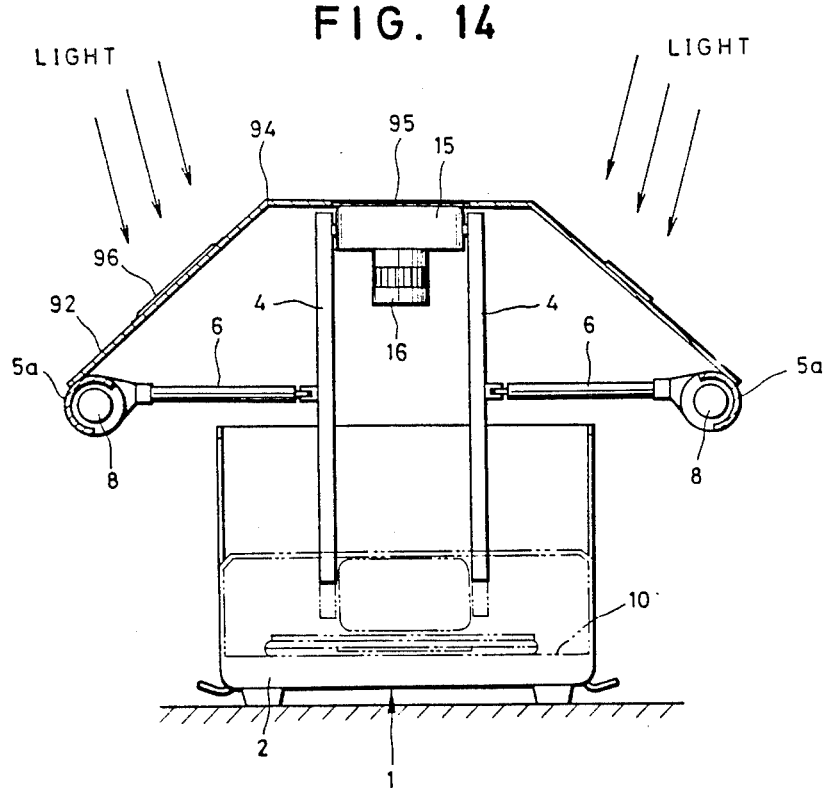
FIG. 14 is an illustration of the shading member attached to the image input apparatus of FIG. 13.

FIGS. 13 and 14 show a shading pad for the use with the image input apparatus shown in FIG. 1. As shown in FIG. 13. the shading pad 92 is formed from a light shielding sheet 93 made of plastic, for example. The sheet 93 is formed with two creases 94 apart from and parallel to the end edges thereof to divide the area of the sheet 93 into three equal sections. At the center of the surface of the center division of the sheet 93, there is a magnet pad 95 secured to the sheet 3 with an adhesive agent. The sheet 93 is folded along the creases 94 to form a shading pad 92 having a shape shown by a phantom line in FIG. 3.

The sheet 93 has a pocket 96 secured to the back of one division thereof for storing various sheet members such as an operating manual sheet, sheets with various charts, a white board used to effect a white balance adjustment, documents for which images are to be inputted, and so forth.

In use, the shading pad 92 is placed over the unfolded image input apparatus, the magnet pad being attracted to an magnetic attractive member, such as a thin steel plate, either separately or integrally formed with the back of the image input head 3. In place of attracting the magnetic attractive member with the magnetic pad 95, mechanical engaging members may be provided between the shading pad 92 and the image input head 3 for mechanically supporting the shading pad 92 on the image input head 3. In inputting an image of a document 9 placed on the table 10 lit with the illumination lamp unit 5, the shading pad 92 can prevent the document 9 from suffering directly from ambient light emitted from a room light or the like which often produces flaring or ghosting.

After use, the shading pad 92 is detached from the image input head 3 and then is folded along the crease to one-third its unfolded size. After placing the folded shading pad 92 on the table 10, the image input apparatus 1 is folded in the manner previously described. By attaching the upper cover 7b, the image input apparatus 1 is formed in a compact rectangular box. The shading pad 92 is stored in the folded image input apparatus 1.

Certain changes and modifications may be made in the above-described optical instrument without departing from the scope and spirit of the present invention.

Accordingly all matter contained in the above description or shown in the accompanying drawings shall be interpreted as illustrative and not limiting. The scope of the invention is to be measured by the appended claims, which follow immediately.

What is claimed is:

1. A foldable optical instrument having a main housing structure with a table provided thereon, and an optical imaging head for providing an image of an original material placed on the table, said foldable optical instrument further comprising:
   head supporting structure for raising-up and folding-down of said optical imaging head, the head supporting structure being mounted on said main housing structure for rotatably supporting said optical imaging head and positioning said optical imaging head over said table;
   a pair of illumination units for illuminating said original material placed on said table
   a pair of illumination unit supporting structures, on each of which a respective one of said pair of illumination units is mounted, for providing raising-up and folding-down movement of said illumination units, said illumination unit supporting structures being mounted on said head supporting structure, each said illumination unit supporting structure positioning each said illumination unit upwardly with respect to said table when said head supporting means is raised up; and
   a cover, attached to said head supporting structure, for covering said pair of illumination units and said pair of illumination unit supporting structures when said head supporting structure is folded down.

2. An apparatus as defined in claim 1, wherein said optical imaging head includes an optical system and an electric image sensor for providing video signals of said original material.

3. An apparatus as defined in claim 1, wherein said illumination unit supporting structure positions said illumination unit laterally with respect to said table.

4. An apparatus as defined in claim 3, wherein said optical imaging head includes an optical system and an electric image sensor for providing video signals of said original material.

5. A foldable optical instrument having an illumination unit, a main housing structure with a table provided thereon, and an optical imaging head for taking an image of an original material which is placed on the table, and illuminated with the illumination unit, said foldable optical instrument further comprising:
   head supporting structure, mounted on said main housing structure, for providing raising-up and folding-down movement for rotatably supporting said optical imaging head and positioning said optical imaging head over said table when raised up:
   an arm, rotatably mounted at one end on said head supporting structure;
   a supporting structure, rotatably mounted on the other end of said arm for rotatably supporting said illumination unit: and
   a link mechanism, connected between said supporting structure and said arm, for turning said supporting structure in cooperation with rotational movement of said arm to position said illumination unit at substantially a right angle relative to said arm so as to bring said illumination unit laterally upwardly with respect to said table.

6. An apparatus as defined in claim 5, wherein said optical imaging head includes an optical system and an electric image sensor for providing video signals of said original material.

7. An apparatus as defined in claim 5, wherein said arm includes friction means for providing friction to said link mechanism when said link mechanism is operated with said rotational movement of said arm.

8. An apparatus as defined in claim 7, wherein said optical imaging head includes an optical system and an electric image sensor for providing video signals of said original material.

9. A foldable, portable image input apparatus comprising:
   a main housing including a table on which an original material whose image is inputted by said image input apparatus is placed;
   an image input unit for providing video signals of said original material placed on said table;
   head supporting pole structure, mounted on said main housing so as to be raised up and folded down, for rotatably supporting and positioning said image input head over said table;
   a pair of illumination units for illuminating said original material placed on said table;
   a pair of illumination unit supporting arm structures, mounted for raising-up and folding-down movement on said head supporting pole structure, for supporting said pair of illumination units on both sides of said image input unit, respectively, each said illumination unit supporting arm structure positioning each said illumination unit laterally upwardly with respect to said table; and
   a cover, attached to said head supporting pole structure, for covering said pair of illumination units and said pair of illumination unit supporting arm structures between said main housing and said cover when said head supporting pole structure is folded down.

10. An apparatus as defined in claim 9, further comprising a shading member which is detachably mounted on said image input head to prevent said original material placed on said table receiving light from other than said image input unit.

11. An apparatus as defined in claim 10, wherein said shading member is sectioned so as to be foldable into three sections and unfoldable, a center section of said shading member being detachably mounted on said image input unit and both side sections of said shading member being supported by said illumination units.

12. An apparatus as defined in claim 11, wherein said shading member, folded, is placed on said table and between said table and said image input unit folded down.

13. An apparatus as defined in claim 11, wherein said center section of said shading member is magnetically mounted on said image input unit.

14. An apparatus as defined in claim 13, wherein said shading member includes a pocket attached to either one of said side sections thereof.

15. A shading member for use with an image input apparatus comprising a table on which an original material is placed, an foldable image input device supported over said table and a pair of illumination units supported on both sides of said image input device, said shading member comprising:
   a center section detachably mounted on said image input device; and
   two side sections formed integrally with said center section, one on each side of said center section, each said side section being supported by each said illumination unit.

* * * * *